Feb. 12, 1957  N. SAUNDERS  2,781,507
AIR RAID ALARM
Filed March 16, 1954  2 Sheets-Sheet 1
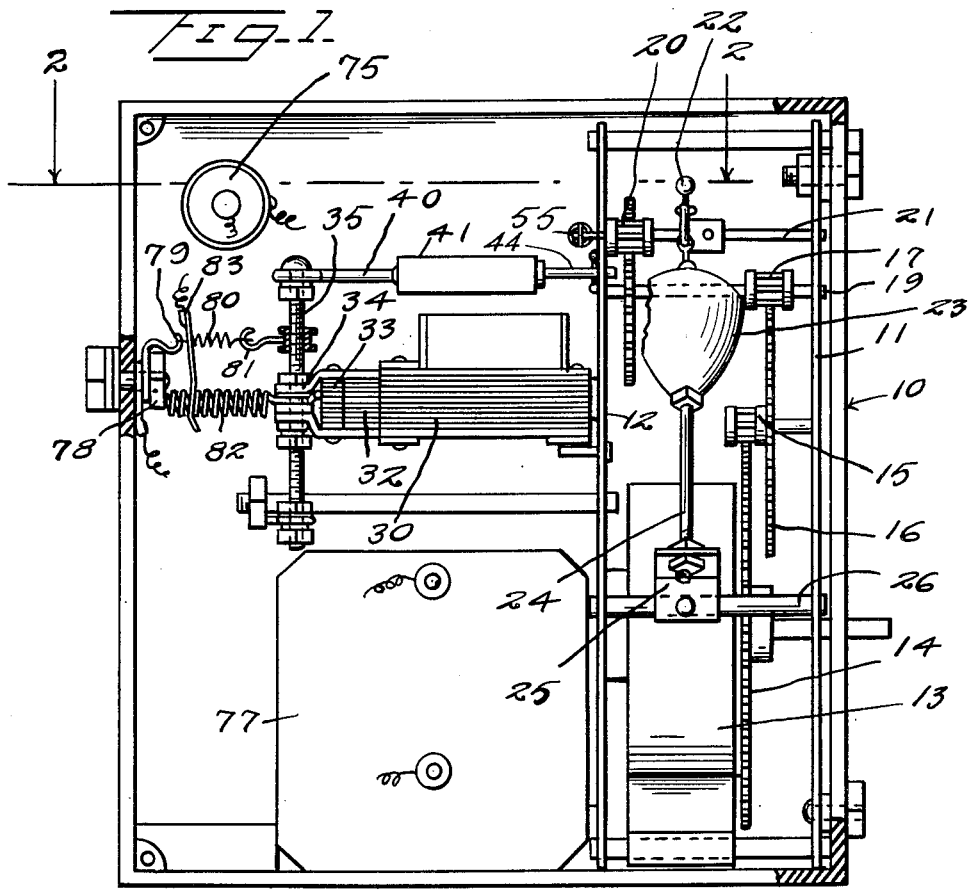
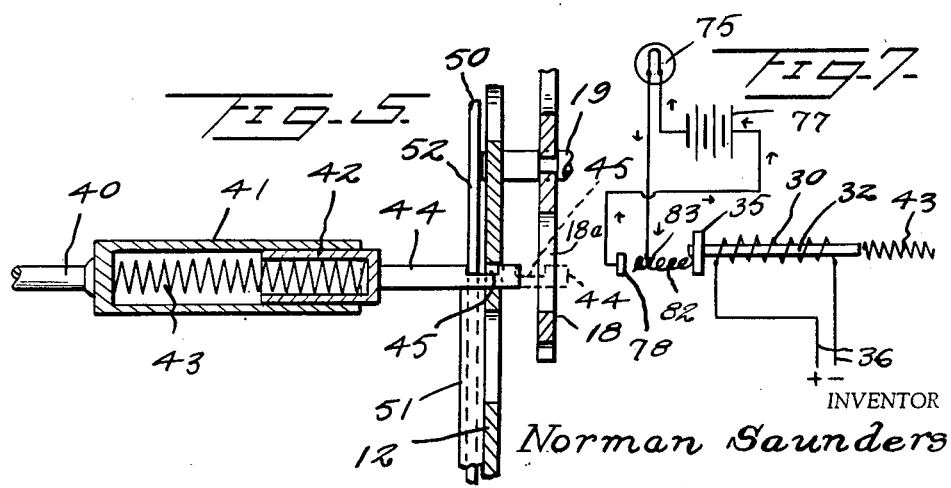
INVENTOR
Norman Saunders
BY Kimmel & Crowell
ATTORNEYS Feb. 12, 1957  N. SAUNDERS  2,781,507
AIR RAID ALARM
Filed March 16, 1954  2 Sheets-Sheet 2
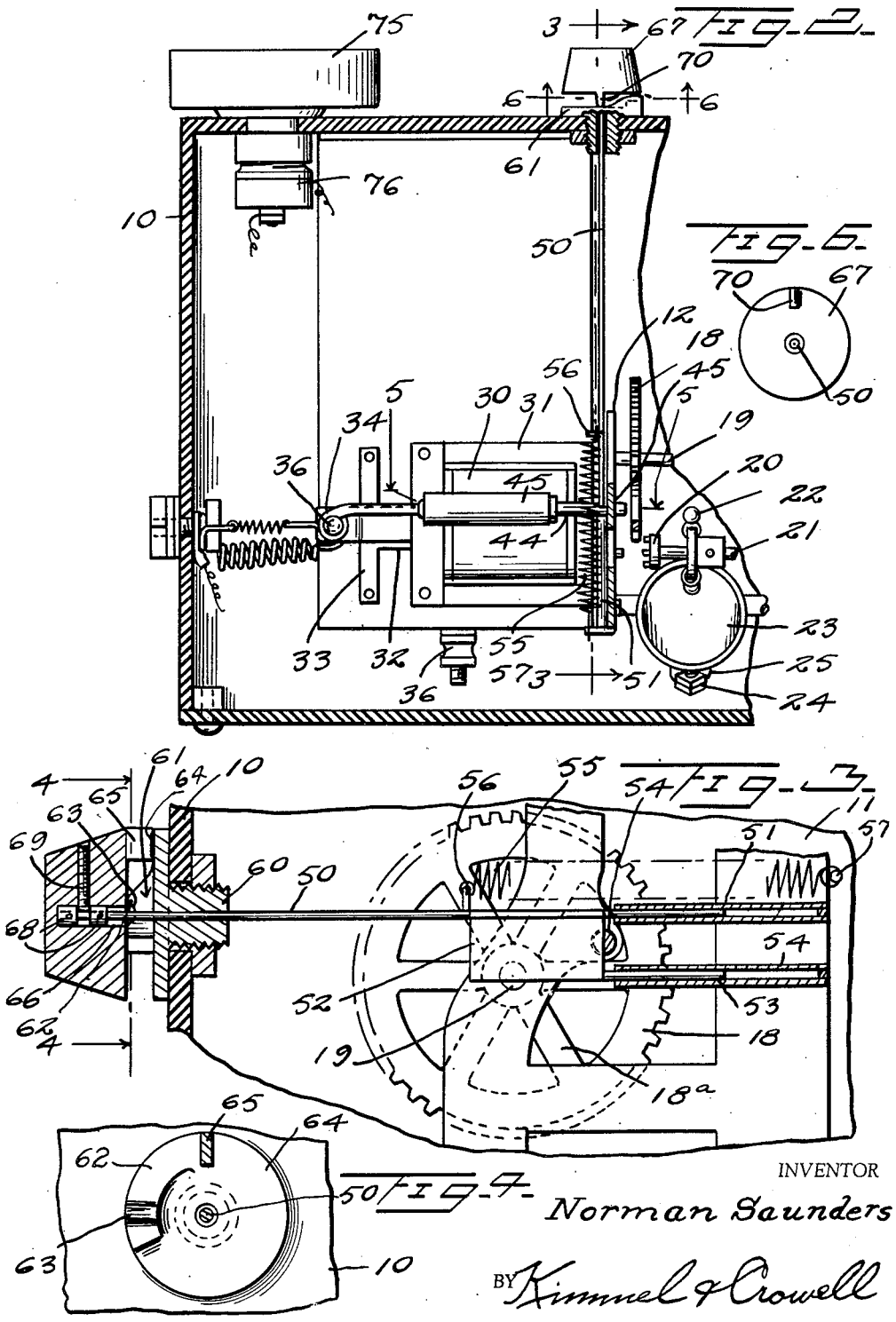
INVENTOR
Norman Saunders
BY Kimmel & Crowell
ATTORNEYS

United States Patent Office 2,781,507
Patented Feb. 12, 1957

2,781,507

AIR RAID ALARM

Norman Saunders, Washington, D. C., assignor of forty percent to Orion T. Whiting, Jr., Washington, D. C.

Application March 16, 1954, Serial No. 416,486

1 Claim. (Cl. 340—253)

This invention relates to an air raid alarm, and more particularly to an individual air raid alarm adapted to be installed in a dwelling or place of business.

A primary object of this invention is the provision of an improved air alarm comprising a bell or other signaling media adapted to be actuated by the shutting off of electric power in the building where the same is installed.

A further object of the invention is the provision of such a device having means which will indicate an accidental disruption of power such as occasioned by the failure of the central power station, or the blowing of a fuse, or the like.

As conducive to a clearer understanding of this invention it may here be pointed out that in commercial localities arrangements have been made to provide an air raid indication by means of intermittent discontinuation of the electric power causing an alternate on and off condition of the electric lights. While this is generally quickly satisfactory, in the event that an alarm occurs during the middle of the night when no lights are on, no alarm will be given. It is another object of this invention, therefore, to provide an audible signal which will be actuated by such discontinuation of electric power, in order to awaken the sleeping household and indicate an air raid alarm. However, power failures may occur under accidental conditions and under such circumstances, in the absence of other provisions, the air raid alarm would be actuated causing unnecessary alarm. The apparatus of the instant invention is provided with a visual signal, preferably taking the form of a red light or the like, which is not actuated in the case of voluntary intermittent cutting on or off of electric power, but which is actuated in the event that the power stays off for any appreciable length of time, thus the occupant may by merely looking at the alarm determine whether an actual air raid alarm is being given which will be indicated by the ringing of the audible alarm and the absence of the visual indication, or whether an accidental cutting off of the current has occasioned the ringing of the audible alarm, in which case the visual indicator will be illuminated.

Still other objects of the invention reside in the combination of elements, arrangements of parts, and features of construction all as will be more fully pointed out hereinafter and disclosed in the accompanying drawings wherein there is shown a preferred embodiment of this inventive concept.

In the drawings:

Figure 1 is a rear elevational view of one form of device embodying features of the instant inventive concept.

Figure 2 is a fragmentary sectional view taken substantially along the line 2—2 of Figure 1 as viewed in the direction indicated by the arrows.

Figure 3 is an enlarged fragmentary sectional view taken substantially along the line 3—3 of Figure 2 as viewed in the direction indicated by the arrows.

Figure 4 is a fragmentary sectional view taken substantially along the line 4—4 of Figure 3 as viewed in the direction indicated by the arrows.

Figure 5 is a sectional view taken substantially along the line 5—5 of Figure 2 as viewed in the direction indicated by the arrows.

Figure 6 is an enlarged sectional view taken substantially along the line 6—6 of Figure 2 as viewed in the direction indicated by the arrows.

Figure 7 is a schematic wiring diagram of the device.

Similar reference characters refer to similar parts throughout the several views of the drawings.

Referring to the drawings in detail, the device of the instant invention comprises a cabinet generally indicated at 10, the rear of which is preferably left open. The cabinet may be of plastic or other desired material and of any desired size.

Positioned within the cabinet is a fixed frame, including front and rear plates 11 and 12 respectively, within which is mounted a conventional clock mechanism including a main spring 13 which drives a gear train including a main drive gear 14, a pinion 15 which drives gear 16 which in turn drives a pinion 17. Pinion 17 drives a sprocket 18 through a shaft 19, the gear 18 in turn rotating a pinion 20 mounted on a shaft 21.

The shaft 21 carries a plurality of flexible clapper elements 22 which are adapted when the device is energized to strike a bell 23 mounted on a support 24 carried by a bracket 25 mounted to a transverse shaft 26 comprising a portion of the frame structure.

From the foregoing, it will be seen that when the spring 13 is properly tensioned by winding, and the gear train released, in a manner to be more fully described hereinafter, that the clapper 22 striking the bell 23 will occasion an audible alarm signal.

Means are provided for normally locking the mechanism against actuation as long as the electric current supplied the house is energized. This means takes the form of solenoid coil 30 mounted in a frame 31 and having a core 32 movable therein, the core 32 including a cross head 33 and a frame member 34 carrying a bolt 35 extending transversely to the cross head 33. A suitable connection to the electric current in the house is provided through a terminal 36 connected to the solenoid coil 30.

One end of bolt 35 is connected to a rod 40 which is secured to a cylinder 41 within which is mounted a plunger 42, the latter being spring biased toward rear wall 12 of the clock mechanism frame as by means of a spring 43. The plunger 42 has secured thereto a rod or plunger 44 which is notched as at 45 adjacent one end thereof.

The arrangement is such that when the current is turned on the solenoid is energized and the inward movement of the core 32 causes rod 44 to move inwardly and engage between the spoke 18a of sprocket 18 as indicated in dotted lines in Figure 5. When the current goes off the solenoid core 32 moves outwardly under pressure of spring 43 to the position indicated in full line, whereupon the gear train is released to sound the audible alarm.

In the absence of means of precluding such movement reenergization of the solenoid would cause the notched rod 44 to move inwardly against the gear train locking the gear train and thus cutting off the alarm.

This, however, in the case of an actual air raid alarm is undesirable and means are provided to prevent the inward movement of the plunger to lock the gear train upon reenergization of the circuit. This means takes the form of a rod 50 one end of which extends into a tube or guide 51 carried by the rear wall 12 of the clock works mechanism. The rod 50 carries a slide member 52 to the lower portion of which is fixed a stud rod 53 engaging in a guide 54 secured to rear wall 12 in parallel relation to guide 51.

A spring 55 connected at one end to a lug 56 carried by the rod 50 and at its other end to a pin 57 carried by rear wall 12 serves normally to bias slide member 52 into abutting relation with the rod 54. Obviously when the member 52 is engaged in notch 45 movement of plunger 44 is substantially precluded.

The end of rod 50 extends outwardly through a suitable fitting 60 in the front wall of casing 10 and passes through the center of a cam member 61 having a high surface 62 including an indentation 63 and a lower surface 64. A stop member 65 is also provided. The outer end of the rod 50 seats in a bore 66 in a control knob 67 and is provided with a pair of collars 68 which are positioned on opposite sides of a set screw 69 extending through the knob.

The inner surface of the knob 67 is provided with a cam follower 70 which follows the contours of cam 61 and by means of the collar and pin arrangements previously described it will be readily apparent that the rod 50 is moved inwardly and outwardly in accordance with the position of the cam follower relative to the cam and that the position of the slide member 52 relative to the notch 45 is governed accordingly.

Thus when it is desired that the alarm be adapted to cut off whenever the current in the system and circuit is on, cam follower 70 is positioned adjacent the high side 62 of the cam. When it is desired to set the device, however, the cam follower 70 is permitted to seat in the notch 63 whereupon the position of the slide member 52 will be controlled by the spring 55 and the relative position of notch 45 on plunger 44, which latter is governed by position of the solenoid core 32.

Means are also provided for actuating a visual signal 75 on the front of cabinet 10 which preferably takes the form of a red light mounted in the socket 76. The light is adapted to be energized by means of a dry cell battery 77 which is connected to the light 75 through a switch member, one contact of which is indicated at 78, and which includes a hook 79 connected by means of a spring 80 to a second hook 81 carried by cross arm 35 mounted on frame 34 of solenoid core 32.

A spring member 82 forms the other contact of the switch and carries a terminal 83. Thus when the solenoid 32 is completely deenergized the contacts 82 and 78 close a circuit and the light 75 is then illuminated. The notch 34, howveer, is elongated to an extent such that reenergization of the solenoid even though the slide member 52 is in the notch will permit movement of the solenoid core and its cross member 25 to an extent sufficient to separate contact 82 from contact 78 and thus break the circuit to the visual signal 75. The wiring diagram disclosed in Figure 7 shows the connections for accomplishing this, and is believed to be fully self-explanatory.

From the foregoing it will now be seen that there is herein provided an air raid alarm including an audible indicator which will be energized continuously upon the discontinuation of the current to the electrical system, whether such discontinuation is intermittent or continuous and a visual signal which will be illuminated only when such discontinuation of current is continuous to indicate a false alarm which alarm device accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

In an air raid alarm, a casing, a clock works mechanism mounted in said casing and including a gear train having a sprocket wheel, a solenoid mounted in said casing, means normally energizing said solenoid, an armature for said solenoid, said armature moving in a direction towards said mechanism when said solenoid is energized and away from said mechanism when said solenoid is deenergized, resilient means biasing said armature away from said mechanism when said solenoid is deenergized, a cylindrical element mounted on said armature, a plunger mounted for reciprocation in said element, means disposed between said element and said plunger constantly biasing said element and said plunger away from each other, said plunger having a notch formed therein adjacent an end thereof, said plunger being moved into engagement with said sprocket when said solenoid is energized to thereby render the clock works mechanism inoperative, an audible alarm in said casing actuated by said clock works, said armature, said element and said plunger moving as a unit away from said mechanism under the influence of said resilient means when said solenoid is deenergized whereby said plunger is disengaged from said sprocket to permit operation of said clock works and said audible alarm, a lock adapted to engage the notch in said plunger to secure said plunger in sprocket disengaged position, means for manually releasing said lock to reset said plunger for normal operation, a battery in said casing, an electric light in said casing, a fixed switch contact, a switch arm, a normally opened electric circuit having connected therein in series said battery, said light, said contact and said arm, resilient means for arresting the outer movement of said armature, said last named resilient means being movable with and in the same direction as said armature, means securing said switch arm on said last named resilient means for movement therewith, means supporting said fixed contact in the path of movement of said switch arm whereby deenergization of said solenoid effects engagement of said switch arm with said fixed contact to close said series circuit and illuminate said light, said light and said audible alarm means operating continuously to indicate a condition of power failure such as would otherwise create a false alarm, and said light operating intermittently with the power changes used in a true alarm.

References Cited in the file of this patent
UNITED STATES PATENTS

| | | |
|---|---|---|
| 1,158,146 | Olney | Oct. 26, 1915 |
| 1,469,946 | Morrison | Oct. 9, 1923 |
| 2,609,431 | Faltz | Sept. 2, 1952 |
| 2,632,887 | Rusnak | Mar. 24, 1953 |